United States Patent [19]

Hölter et al.

[11] Patent Number: 4,530,817

[45] Date of Patent: Jul. 23, 1985

[54] APPARATUS FOR THE PROTECTION OF AIR FED TO A LABOR-PROTECTION OR VEHICLE COMPARTMENT

[75] Inventors: Heinz Hölter, Beisenstrasse 39-41, D-4390 Gladbeck; Heinrich Igelbüscher, Gladbeck; Heinrich Gresch, Dortmund-Wickede; Heribert Dewert, Gladbeck, all of Fed. Rep. of Germany

[73] Assignee: Heinz Hölter, Gladbeck, Fed. Rep. of Germany

[21] Appl. No.: 600,195

[22] PCT Filed: Dec. 31, 1980

[86] PCT No.: PCT/EP80/00156

§ 371 Date: Sep. 2, 1981

§ 102(e) Date: Sep. 2, 1981

[87] PCT Pub. No.: WO81/01963

PCT Pub. Date: Jul. 23, 1981

Related U.S. Application Data

[63] Continuation of Ser. No. 302,424, Sep. 2, 1981, abandoned.

[30] Foreign Application Priority Data

| Jan. 3, 1980 [DE] | Fed. Rep. of Germany | 3000078 |
| Jan. 15, 1980 [DE] | Fed. Rep. of Germany | 3001210 |
| Jan. 16, 1980 [DE] | Fed. Rep. of Germany | 3001336 |
| Jan. 16, 1980 [DE] | Fed. Rep. of Germany | 3001393 |
| Feb. 8, 1980 [DE] | Fed. Rep. of Germany | 3004675 |
| Feb. 20, 1980 [DE] | Fed. Rep. of Germany | 3006323 |
| May 16, 1980 [DE] | Fed. Rep. of Germany | 3018695 |
| Jul. 26, 1980 [DE] | Fed. Rep. of Germany | 3028433 |

[51] Int. Cl.³ .......................................... B01D 53/36

[52] U.S. Cl. .......................... 422/122; 55/74; 55/267; 98/2.11; 165/61; 422/171; 422/173; 423/239; 423/244; 423/247

[58] Field of Search .................. 422/4, 5, 169-171, 422/122-125, 173; 423/239, 244, 247; 98/2.11, 2.14, 2.15; 165/61, 64; 55/73, 233, 267, 498, 74; 261/106, 158-161, DIG. 4, DIG. 17

[56] References Cited

U.S. PATENT DOCUMENTS

| 2,151,097 | 3/1939 | Germanprez | 98/2.11 X |
| 2,602,878 | 7/1952 | Holody | 98/2.11 X |
| 2,796,014 | 6/1957 | Montgomery et al. | 261/DIG. 4 |
| 2,970,456 | 2/1961 | Rice | 261/DIG. 4 |
| 3,042,383 | 7/1962 | Pennington | 261/122 X |
| 3,259,050 | 7/1966 | Grimm, III | 98/2.11 |
| 3,329,077 | 7/1967 | Grosso | 98/2.11 |
| 3,348,830 | 10/1967 | Pearl et al. | 261/161 |
| 3,488,928 | 1/1970 | Tarala | 55/498 X |
| 3,497,312 | 2/1970 | Zeff et al. | 422/122 X |
| 3,498,026 | 3/1970 | Messinger et al. | 55/73 |
| 3,804,942 | 4/1974 | Kato et al. | 422/122 X |
| 3,883,637 | 5/1975 | Benedict | 422/122 X |

FOREIGN PATENT DOCUMENTS

| 1095128 | 12/1960 | Fed. Rep. of Germany | 422/122 |
| 2347335 | 4/1975 | Fed. Rep. of Germany | . |
| 2603750 | 8/1977 | Fed. Rep. of Germany | . |
| 2635860 | 2/1978 | Fed. Rep. of Germany | . |

Primary Examiner—Richard L. Chiesa
Attorney, Agent, or Firm—Karl F. Ross; Herbert Dubno

[57] ABSTRACT

A chemisorption filter preceded by a heater is used to feed air to a vehicle passenger compartment or like cabin adapted to be occupied by a person. The chemisorption filter removes noxious and toxic ambient contaminants from the air before it is admitted to the cabin.

4 Claims, 13 Drawing Figures

APPARATUS FOR THE PROTECTION OF AIR FED TO A LABOR-PROTECTION OR VEHICLE COMPARTMENT

CROSS REFERENCE TO RELATED APPLICATIONS

This application is a continuation of our copending application Ser. No. 302,424 filed Sept. 2, 1981 (now abandoned) which, in turn, was a National Phase application corresponding to PCT/EP80/00156 filed Dec. 31, 1980 and based upon a German application of Jan. 3, 1980 under the International Convention.

The invention relates to an apparatus for purification of air fed to a labor protection or vehicle cabin, which comprises at least one filter, which has a carrier material permeable to air and chemisorption masses and/or catalyst masses are disposed or contained at and/or in the carrier.

BACKGROUND OF THE INVENTION

It is known to build dust filters into the intake channels of vehicle cabins for providing fresh air. These dust filters retain the dust carried with the air, but otherwise they are not able to meet the requirements for an active protection of the passengers in the cabin against pollutants, which are carried by the air. Pollutants are found in the intake fresh air in particular with high traffic densities and such pollutants include for example hydrocarbon compounds, nitrogen oxides, acid gases (for example sulfur dioxide and other sulfur compounds as well as carbon dioxide). In addition, the intake fresh air contains carbon monoxide. It is in fact known that such pollutants can be removed from the air by way of chemisorption masses, however their use in the fresh air intake for vehicle cabins has failed so far based on the expensive construction requirements and the costs to be paid. The situation with labor protection cabins is similar, where also air containing pollutants can enter.

OBJECT OF THE INVENTION

It is an object of the present invention to provide an apparatus of the kind set forth which avoid the disadvantages mentioned above.

The process and apparatus are also to allow in a simple manner perfect purification of the intake air and to provide for comparatively high service life of the chemisorption masses and/or catalyst masses employed and thus of the filters.

SUMMARY OF THE INVENTION

This is achieved by the process of warming the air to be purified fully or in part and then feeding the air to the filter or filters. By prewarming of the air stream or air streams the deposition of humidity at the filters is prevented, which humidity deposition affects very negatively the activity of the chemisorption masses and/or of the catalyst masses. For example, it is known that chemisorption masses or also catalyst masses for the conversion of for example CO into $CO_2$ or also for the deposition of $NO_x$ and hydrocarbon compounds, are very strongly negatively affected by the presence of humidity.

In order to eliminate this disadvantage we dispose the complete filter unit such that it is not located in the natural intake region for the fresh air but rather the air to be taken in is sucked in at the side opposed to the side of the coming stream. This can occur in the front area of the vehicle; however the air has to be redirected and based on this the water drops are not sucked into the filter at the low intake speed. Preferably the air is sucked in at the side opposite to the usual streaming in.

In accordance with a further feature of the invention it is proposed to regenerate while mounted the filter attached and serving for the deposition of $NO_x$, HC and CO such that a partial amount of the sucked in air flushes via an aeration channel and/or via a blower the chemisorption filter and thus allows reasonably a removal of the humidity from the silica gel and CO-catalysts (for example). The sucked in air can be employed in part for the flushing of the chemisorption filter in reverse direction and simultaneously fresh air, preferably prewarmed, can be used for the preferred reverse flushing of the chemisorption filter, without at the same time interrupting the fresh air feeding to the vehicle cabin section.

It is known to remove CO in labor protection or vehicle cabins in filters via hopaclite [transition metal oxide mixture]masses; however upon air flowing through enriched in CO, the hopaclite usually receives humidity from the passing air.

This humidity leads to the destruction of the removal capacity of the hopaclite.

In order to maintain the hopaclite active, preferably for the removal of CO in the air supply of rooms where humans work, the invention provides that the water vapor pressure of the air is above the point of humidity acceptance of the hopaclite and thus of the absorption layer and/or of the remaining additionally provided chemisorption layers, for example for the elimination of $NO_x$ and hydrocarbon (HC)-compounds.

This is achieved in accordance with the invention by warming the chemisorption masses such as the hopaclite to such an extent that the described desired effect occurs. This effect is reached for example for certain mass compositions at about 50° C. This step would of course heat up the intake air to such an extent that the humans to be protected would be strongly affected by the high air temperatures.

In order to avoid this it is further disclosed in accordance with the invention to perform the heating up of the chemisorption masses in such a way that the device for the warming up of the chemisorption masses or the like is such built into the process. The intake air to be purified by itself and/or with the chemisorption masses can be heated up by the unit and the outflowing air is cooled again by the cooling power generated by the unit from say 50° C. to 30° C.

The invention assures that the chemisorption masses or the like provide a ten-fold higher service life as compared with the state of the art and on the other hand the air separated from the pollutants passes at low temperature again into the circulation.

In order not to have to choose the heating power too high it is disclosed in the present invention for the removal of pollutants and for preferred cooling of the breathing air for labor protection cabins and vehicle cabins to feed the air to be separated from pollutants initially at the natural temperature prevailing through chemisorption and filter masses and to free the air at this stage from acid gases, hydrocarbons and solid materials such as dust and then to heat the air by way of a heating device to such an extent that the water vapor pressure of the air is sufficiently above the point of humidity retention of the following catalyst masses for the transformation of CO into $CO_2$ and that after the passage of the catalyst masses the air freed from pollutants is fed to a cooling zone which cools the air to such an extent as is appropriate for the work place in the labor protection cabin or vehicle cabin.

The invention extends in addition to a device of the initially recited kind, which is formed such that one or more heating devices is or are disposed in front of the filter or respectively filters in the path of the stream of the complete or partial air stream to be purified. As already set forth, the preheating of the air to be purified is very advantageous for the service life of the filters, since the deposit of moisture is substantially avoided.

SPECIFIC DESCRIPTION

Figure 1:
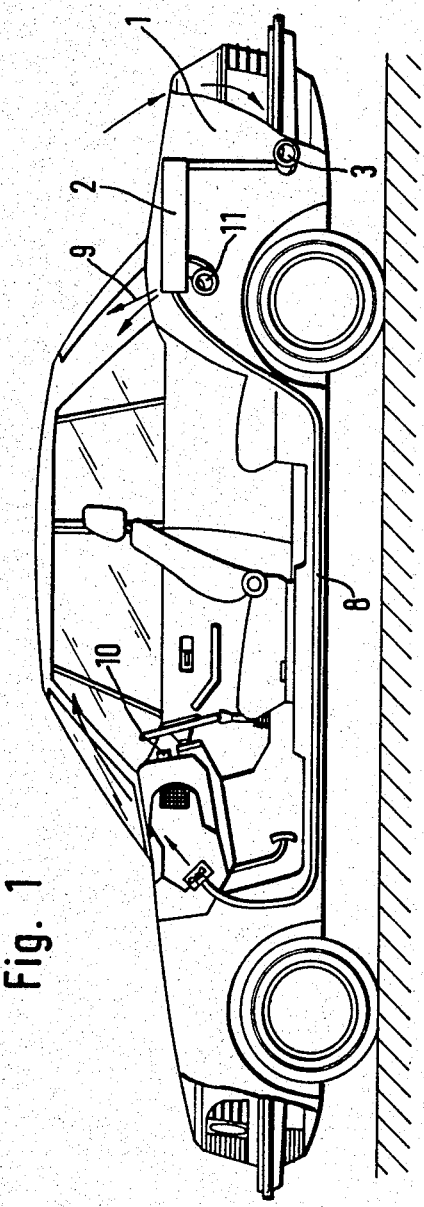
FIG. 1 is a partial sectional side view of a motor vehicle comprising the apparatus of the invention.
Figure 2:
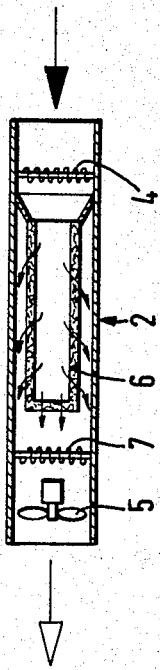
FIG. 2 is a schematic representation of part of the inventive apparatus.

In the embodiment according to FIG. 1 and FIG. 2 the trunk is designated as 1 for the motor vehicle and the chemisorption filter packet 2 is contained in the trunk. The chemisorption filter packet 2 comprises preferably tubular bodies telescoped into each other and preferably formed with double walls and which are reinforced with webs in order to brake a shifting of the filled-in chemisorption masses or catalyst masses or to prevent the same. The intake pipe 3 is disposed in the protected shadow region of the oncoming flow and sucks air in against the oncoming flow such that water droplets cannot be redirected at the same time. The heating device 4 is disposed at the suction side and the blower 5 is provided at the vent side. The chemisorption filter itself is designated as 6 and its telescoped filter tubes are for example filled with different materials. An additional heater 7 is provided at the vent side. The aeration tube 8 serves to feed air from the rear into the vehicle cabin. The venting of the passenger area is performed for example from the rear or alternatively from the side or from behind the rear head rests as is indicated by way of the arrows 9. A congestion key or smog key 10 is provided at the dashboard of the vehicle, which key is switched on upon strong environmental loading by other vehicles. An exhaust vent diaphragm is designated as 11, from which part of the recirculated air can exit into the passenger area.

Because of the disposition of the chemisorption filter for example in the area of the trunk or in the area of the rear seat bench it is not necessary to enlarge the generally very crowded motor space, which in many cases also results in a disadvantageous influence upon favorable aerodynamic characteristics, since the wedge shape of the vehicle would be disadvantageously influenced by the mounting of a chemisorption filter in the area of the motor hood.

The venting process and the apparatus according to the invention can be switched such that by pressing a key, for example the smog key or the congested traffic key, the air is no longer fed to the interior of the car through the presently known intake channels and also, as is known with some vehicle types, the air is not just recirculated in the inner of the vehicle with no air feed from the outside or is warmed or cooled with a temperature conditioning unit, however continuously circulated and thus turning inbearable for the passengers, but instead a partial air amount is pressed into suction slots 3 disposed on the side remote from the leading edge and via a chemisorption packet into the interior of the car as indicated at 9, or via the aeration tube 8, such that fresh air purified from pollutants is fed to the passengers and a partial amount of air, which approximately corresponds to the purified air added, is removed from the interior of the vehicle via the exhaust vent diaphragm 11. The partial amount of air is correspondingly preheated with the heating device 4 such that the chemisorption filter masses as well as the catalyst masses are encountering only relatively minor amounts of humidity.

The blower 5 can be reversed in its suction direction such that upon release of the smog key or the congestion key 10 air is sucked out of the interior of the car, this air is heated via heating device 7 and regenerated in the filter 6, where the air is preferably heated very high to for example 60° C. or higher and the blower 5 sucks in, while in reverse operation for feeding hot air for the purpose of regenerating the chemisorption filter 6, only a smaller amount of air as compared to the venting phase.

By way of this mode of venting in accordance with the invention in non-congested driving the vehicle is vented in a conventional way and upon city driving or in congested driving on the highways the air is pressed via the chemisorption filter into the cabin area and during the time not requiring filtration the filter can be regenerated. This assures that the filter has a long service life since the time for congested driving and for city driving is usually with normal use of vehicles not more than 10 to 20 percent.

In this embodiment the venting of the vehicle is performed such that upon driving through congestion the regular supply of fresh air is interrupted and the desired cold or warm air is circulated in a cycle and by way of an additional unit chemically purified air is pumped into the passenger cabin such that a desired partial amount of air which is recirculated can escape from the vehicle and the passengers are constantly fed with fresh air.

Figure 3:
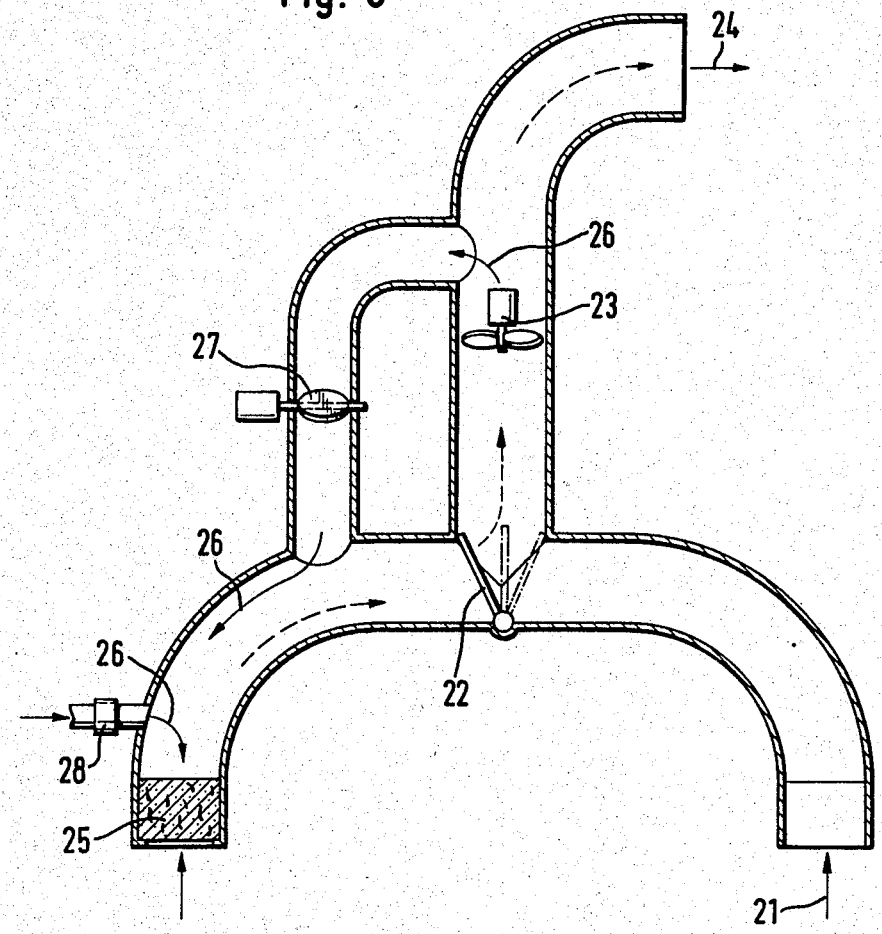
FIG. 3 is a view of an additional embodiment of the apparatus according to the invention.

In the embodiment according to FIG. 3 the fresh air intake without filter is designated as 21. A control flap provision 22 is provided in a U-shaped tube part and the flap allows on the one hand that that the air from the fresh air intake flows in without passing a filter and on the other hand that the fresh air can be fed in via the chemisorption filter 25. The blower 3 carries the air, which according to arrow 24 enters the vehicle cabin as well as the flushing air, which according to the arrows 26 serves to regenerate and activate the chemisorption filter 25. The fresh air or warm air feed is designated as 28.

The venting of vehicle cabins is constructed such that it is connected to a regular fan or air-conditioning and heater such that the sucked-in air can be either pulled in free without passing a chemisorption filter in order to be available in the driver cabin or alternatively the air passes over a chemisorption filter and upon corresponding congested driving or city driving the filter 25 can be switched on as desired.

After termination of the city driving or the congested driving, that is when the pollutant loading with for example $NO_x$, HC and CO has ended, a flushing amount of air according to arrows 26 can be cooled or heated by switching the control flap 22 or fresh air can regenerate and activate the chemisorption filter masses via the feed pipe connection 28.

Figure 4:
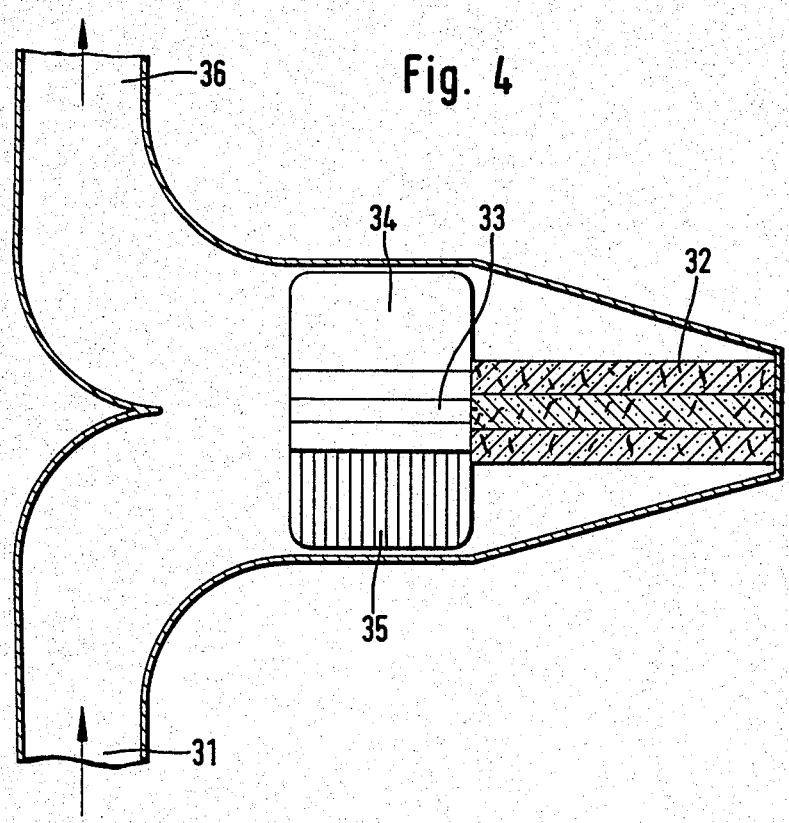
FIG. 4 is a schematic representation a view of an additional embodiment according to the invention.

In the embodiment of FIG. 4 the incoming air is designated as 31 and the chemisorption filter packet is designated as 32. A heating and cooling device 33 precedes the chemisorption filter packet and is preferably constructed as a Peltier-element. Cooling fins 34 are attached to the heating and cooling provision which cooling fins are disposed in the vent channel. Heating ribs 35 are also disposed in the air intake channel. The exhaust air channel is designated as 36. This construction achieves a strong heating of the chemisorption masses such as for example hopaclite such that the depositing of moisture from the passing air is avoided. In order to prevent too much warming up of the purified air, the device for the heating of the chemisorption masses or the like is such built into the total process that the incoming air to be purified solely and/or with the chemisorption masses or the like is heated by way of the aggregate and the up-streaming air is cooled again through the cooling power of the aggregate such that for example a temperature decrease occurs from 50° C. to 30° C.

Figure 5:
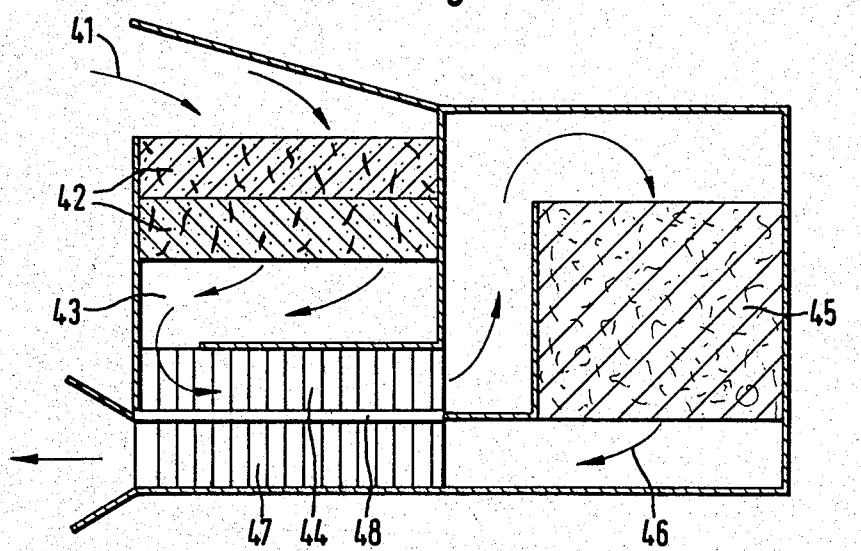
FIG. 5 is a sectional view of a further embodiment according to the invention.

According to the embodiment of FIG. 5 only the air or respectively the masses are heated, which are to transform catalytically CO into $CO_2$ in order to avoid having to use too high a heating power.

The intake side of the pollutant containing air is designated as 41, which air passes over the chemisorption masses 42 which serve for the depositing of acid gases such as for example $SO_2$, $NO_x$, hydrocarbon and also solid, dust-like pollutants. The channel 43 serves as a catch space for the prepurified gas, which is fed to the heating surface 44 such as for example heated ribs. From the heating surfaces 44 the prepurified gas passes through the catalyst layer 45 such as for example hopaclite, wherein CO is transformed into $CO_2$. The air exiting out of the catalyst layer 45 is purified, breathable and designated as 46 and it is in still heated state fed to the cooling fins 47 for cooling and later use as breathing air. A combined heat and cooling generating unit is designated as 48 and the aggregate 48 heats up on the one side the prepurified air via the heating surface 44 and on the other side cools with its cooling effect the cooling fins 47. For this purpose known Peltier elements can be employed.

The sucked in air loaded with pollutants is initially pressed through or sucked through the chemisorption masses and here separated from acid gases, solid materials and hydrocarbons, in order to be thereupon heated to such an extent that the water vapor pressure of the air is disposed above the humidity retention point of the catalyst and thereupon the air is cooled via the cooling power of the warming aggregates and/or via additional cooling aggregates according to need to such an extent that for example for summer operation this aggregate not only serves as a chemisorption filter, but at the same time as air-conditioning for the labor protection or driver cabins. The air is preferably heated by 50° C. in order to avoid that the catalyst becomes inactive based on moisture retention upon flow-through of the air.

It is known that sunny, rainy, foggy and cold weather strongly influence the sucked in amounts of air by way of the load in moisture. The chemisorption masses show different sensitivity to retained moisture, in particular the CO-catalyst is very sensitive to moisture such that already upon a small amount of moisture retained the chemisorption decreases strongly. In order to eliminate nearly completely the disadvantages of the humidity retention, in the embodiment of FIG. 6 the casing of the chemisorption filter is mounted within the natural waste heat range of the motor as a capsule.

This ensures that the sucked in air can be heated by one up to several degrees depending on construction and that thereby no moisture transfer is performed to the chemisorption masses such that the chemisorption is not affected by the humidity in the air. In addition, after the turning off of the engine the radiation is so large that the filter casing and therewith the chemisorption masses are subjected to a continuously repeated drying process and regenerated, whereby the chemisorption masses are again completely dry and active at each new start of the automobile travel. This construction avoids the use of extrinsic energy such as through heating sprials or outside heating devices completely, which would require additional energy or respectively reduce the motor power and thereby cause additional costs. Nevertheless the natural heating, in order to set up the suitable provision of the capsule filter device in the irradiation region of the engine, increases the service life of the chemisorption filter by a multiple and thereby renders the same only economically viable.

Figure 6:
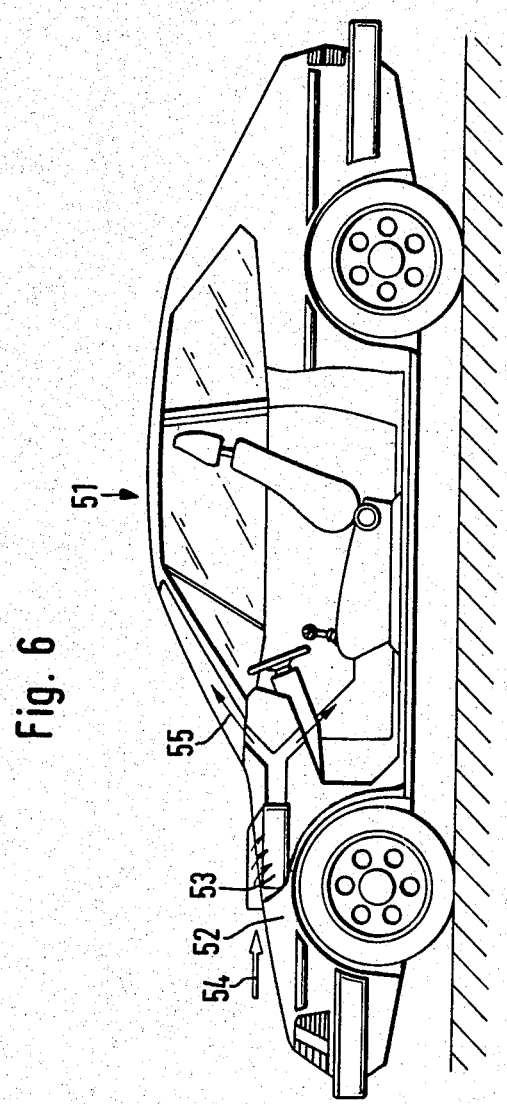
FIG. 6 is a side view of an opened motor vehicle with a built-in apparatus according to the invention.

In FIG. 6 a passenger motor vehicle is designated as 51, the motor space 52 of which comprises a capsule filter 53. The fresh air intake is indicated by arrow 54. The arrow 55 designates the feed of the purified air into the interior of the vehicle 51. The air is necessarily passed through the filter heated from the outside with engine heat.

The air heating of for example 1° to 2° C. or at hot summer days is unimportant, while the heating of the air during the winter months is even desirable inside the vehicle. In this embodiment, capsule filter media not influenced by motor smell or exhaust gases are to be disposed within the region of the motor waste heat radiation. The filter media can be exchangeable layer by layer depending on use and fresh air can be fed from outside the hood, this can be heated up to some extent and can flow through the chemisorption masses with relatively lower specific humidity, in order to serve for the persons in the cabin as purified breathing air.

Figure 7:
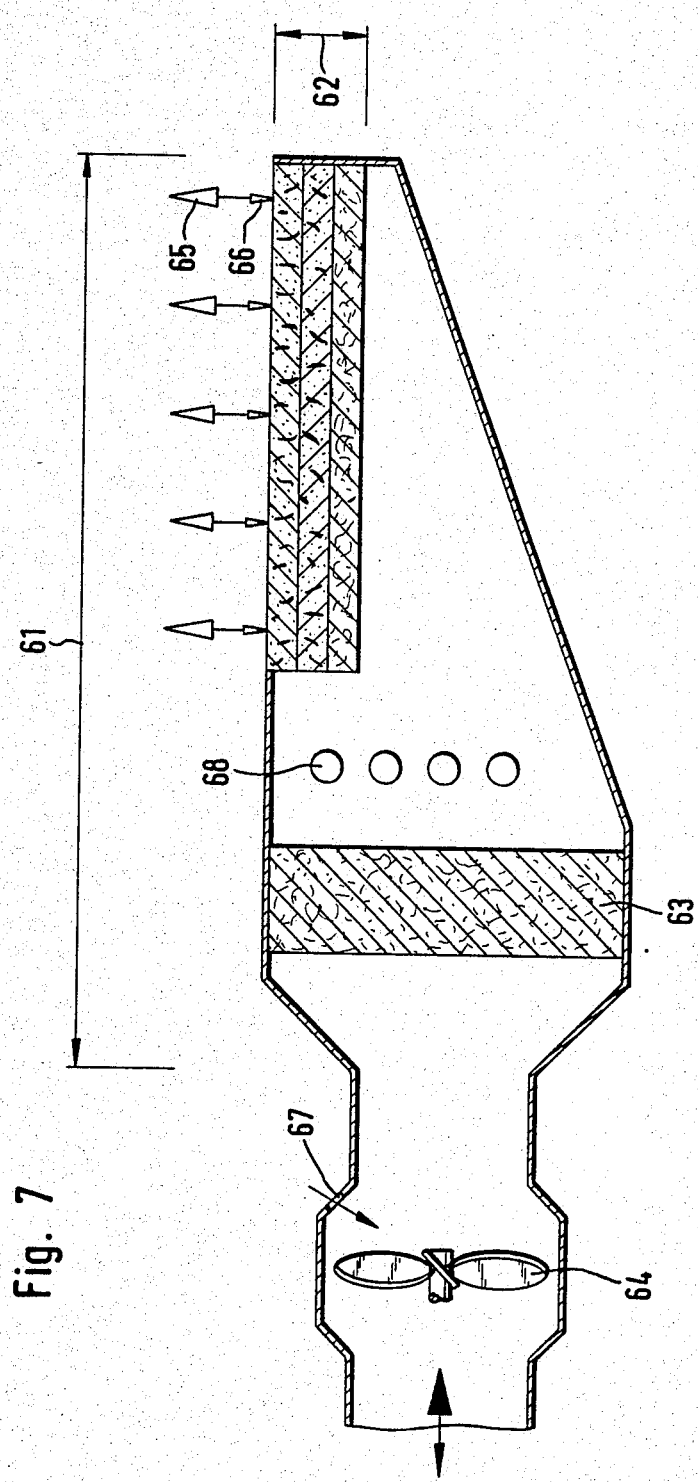
FIG. 7 is a partial sectional view of a further embodiment according to the invention.

In the embodiment of FIG. 7 a preceding humidity receiving layer is regenerated solely and only a small amount of air is heated up very high, which drives out the humidity and blows it via a blower to the outside. It is possible this way to keep the energy required for heating up relatively small. In order for the blower to survive the high temperatures, it is constucted such that it sucks in during the regeneration cycle secondary air to the hot primary air and the air is cooled during the flushing of the blower to such an extent that the blower cannot be damaged. In this embodiment the complete chemisorption filter is designated as 61 and the multilayer absorption masses are designated as 62. A drying layer 63 is preposed to the multilayer absorption masses, which drying layer serves for humidity retention. The reversible blower 64 presses more air into the chemisorption filter as it sucks back with reversed rotation. The large amount of air, which is pressed up for the venting of the cabin through the chemisorption filter 62 is designated with the arrows 65. The arrows 66 indicate the much smaller amount of air, which is sucked from the cabin and heated strongly via a heating device, preferably a heating coil 68 such that the humidity is carried from the drying layer 63 to the blower 64, which is controlled via 67 and at the same time sucks an amount of cooling air such that the blower 64 does not become too hot.

The preceding drying layer 63 is heated separately by a heating coil 68, which is fed from the battery and/or from the light engine, and assures that with smaller heating power only the preceding gas drying layer is regenerated and the chemisorption masses or respectively catalyst masses 62 do not have to be heated high in order to heat up the regeneration air amount 66 such that it is heated sufficiently high, for example to above 90° C., for the regeneration of the drying layer 63.

In this embodiment a separate drying layer 63 is provided, which precedes the proper chemisorption and catalyst masses, where the heating coil serves on one hand to the desired warming up of the sucked in fresh air, for example to 20° C. or 30° C., and upon reverse running of the blower 64 the small amount of air for regeneration is heated to such an extent that the humidity is driven out and thus still sufficient humidity is available in the chemisorption masses for the absorbing of the pollutants.

Figure 8:
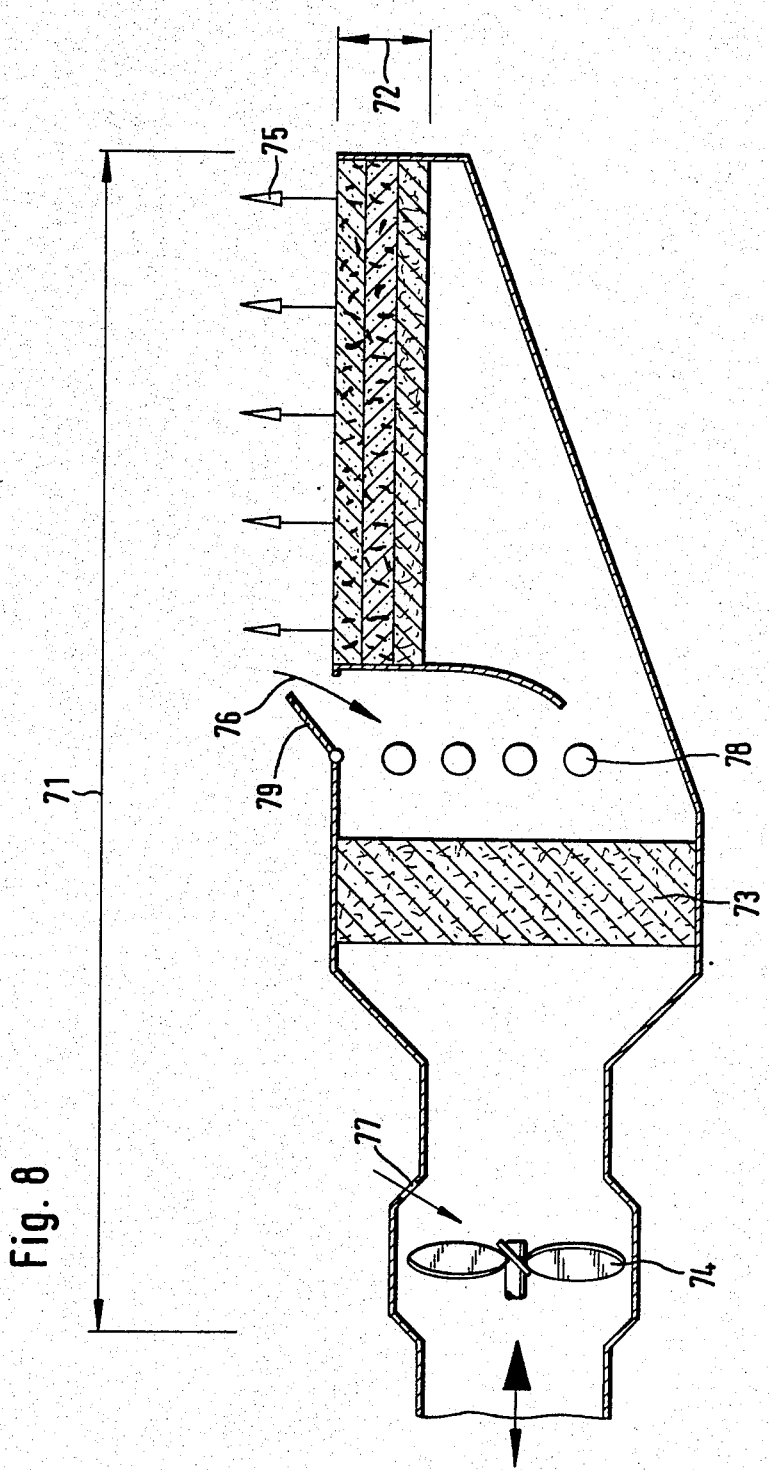
FIG. 8 is a partial sectional view of a further embodiment according to the invention.

The embodiment of FIG. 8 represents a further development of the embodiment of FIG. 7. In order not to have to suck in the humid air from the cabin during the regeneration phase via the catalyst masses and chemisorption masses, which air is to serve for warming up and following regeneration of the drying layer, there is provided a secondary flap 79. The complete chemisorption and catalyst filter is designated with 71 in FIG. 8 and the multilayer chemisorption and catalyst masses are designated as 72. A drying layer 73 precedes the chemisorption and catalyst masses and serves for humidity retention. The reversible blower 74 presses more air into the chemisorption filter than what it sucks back upon regeneration. The amount of air, which is pressed through the filter for venting the vehicle cabin is designated by the arrows 75. The much smaller secondary amount of air 76, which is sucked from the vehicle cabin and which is heated up strongly by the heating device 78, passes through the drying layer from the rear such that it removes the humidity from this drying layer 73 via the blower 74. An amount of cooling air can also be sucked in via the opening 77 such that the blower 74 does not become too hot.

The secondary air flap 79 allows depending on its position to suck in the secondary air amount 76 in front of the chemisorption and catalyst masses 72 in order to feed it thus without release of air humidity to the absorbing section 72 to the heating devices 78 such that the secondary air 76 in a hot state regenerates the drying layer 73. This embodiment achieves that during the regeneration phase the humid air has not to be sucked via the filter masses 72, but that the secondary air 76 provided with heat behind the filter masses 72 becomes sucked in to be led via a heating device 78 to the regeneration of the drying layer 73 passed flap 79. A dust filter layer such as a web filter can precede the drying as well as the filter masses and the secondary air feed in order to free the chemisorption masses, catalyst masses and drying masses from extrinsic materials such as dust.

Figure 9:
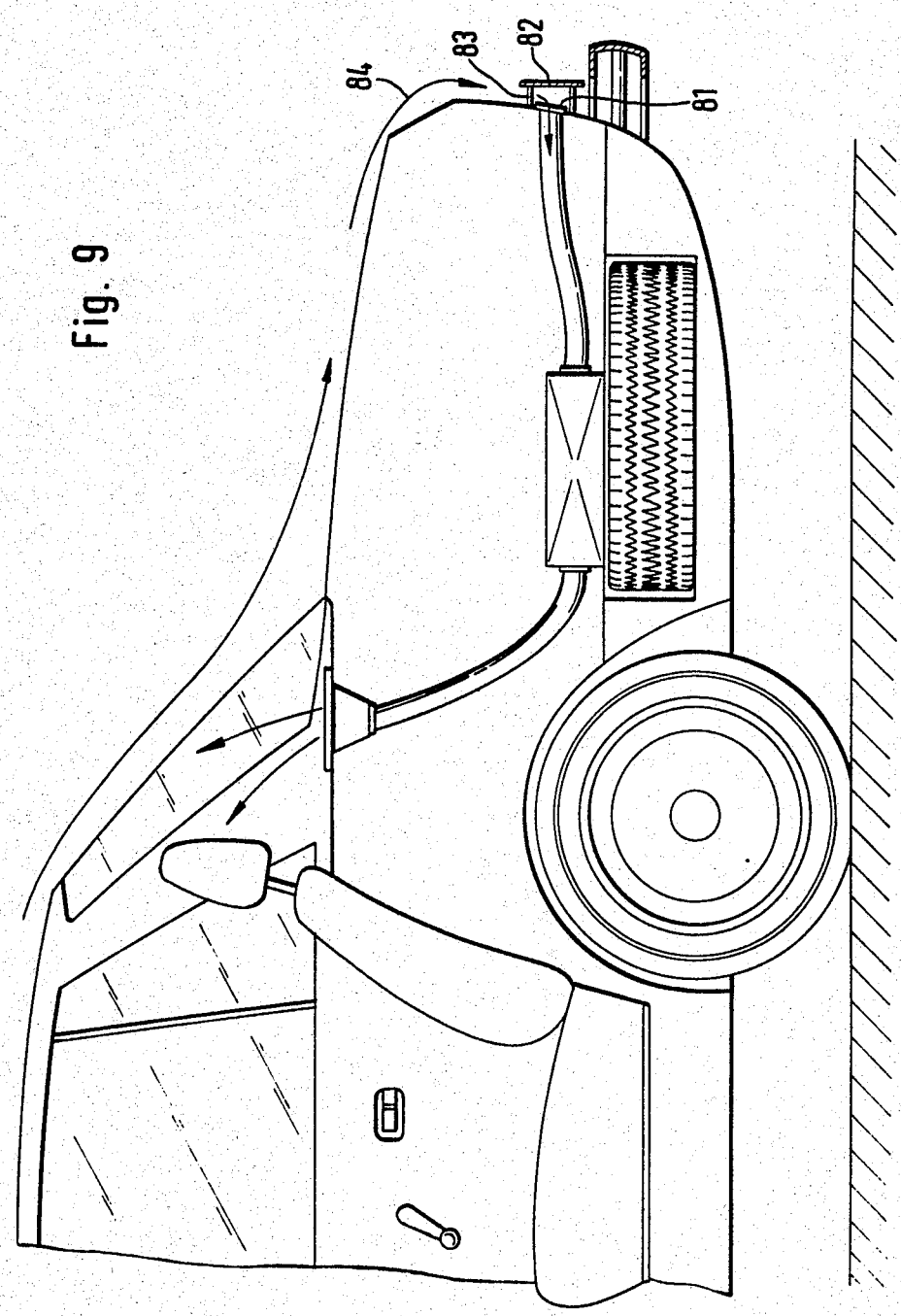
FIG. 9 is a side view of the tail of a motor vehicle with the built-in apparatus according to the present invention.

An embodiment is shown in FIG. 9 where the filter means is disposed in the trunk of a motor vehicle. This embodiment allows a suction, which does not result in changes in the outer appearance of the vehicle. For this purpose the suction intake opening is disposed behind the license plate behind the trunk. The suction intake opening behind the license plate 82 is designated as 81. Between the stop sheet and the license plate 82 there are provided spacers 83 such that the air amount indicated by the arrow 84 can pass unimpeded und invisible for the outside person behind the license plate into the trunk and can be fed necessarily through the same via the provided hoses to the filter means and from the filter means into the interior space of the vehicle.

Figure 10:
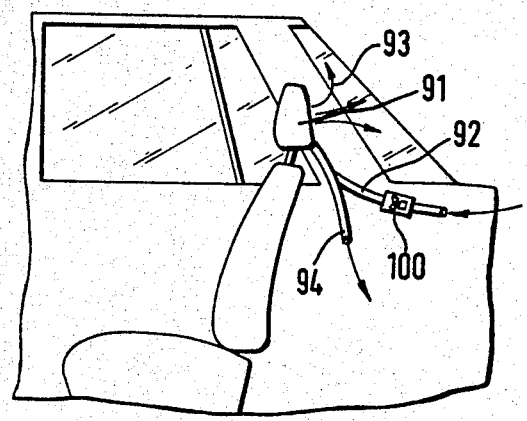
FIG. 10 is a schematic representation of a side view of the rear seats of a motor vehicle.
Figure 11:
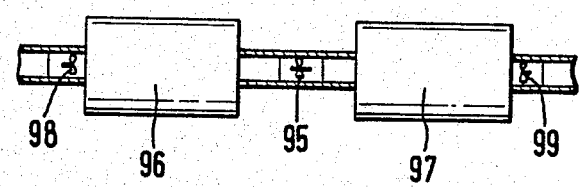
FIG. 11 is a view of the head rests of two neighboring rear seats according to FIG. 10.
Figure 12:
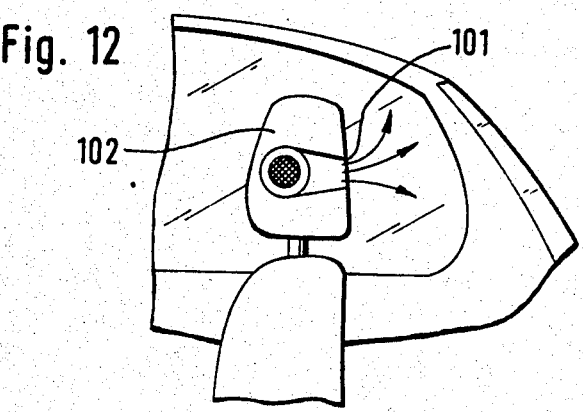
FIG. 12 is a side view of the rear seats of a motor vehicle in an additional embodiment.

Embodiments are shown in FIGS. 10 to 12 which allow the filter devices to be disposed, not in the trunk or engine area of a motor vehicle, but in contrast employ the head rests of the seats for the purification of the air, and in fact preferably the head rests of the rear seats. The system can be constructed such that it serves as an individual head rest or as a double head rest and that a good upholstering is provided in the outer shell, preferably in the region of the head support area.

The head rests at the rear seats of the motor vehicle are designated as 91 and they are connected to suction lines 92. The arrows 93 indicate the exiting of the purified air into the vehicle cabin. The vent line 94 serves for regeneration of the chemisorption masses, which are not further shown in detail. The blower 100 is disposed in the area of the trunk space, in order to keep the noise background in the area of the head rests as low as possible. The blower 95 is disposed in the middle between the head rests 96, 97 as shown in FIG. 11. It is also possible to provide however in the areas outside the two head rests 96,97 additional blowers 98, 99. The head rests 96, 97 are particularly strong upholstered against impact.

In the embodiment according to FIG. 12 the head rest 102 itself has provided air exit openings 101 at the side toward the tail window and opposite to the side for resting the head. Upon positioning the blower 95 in the middle between the two headrests 96,97 there is provided a substantial protection against impact such that an endangering through the blower practically can be excluded.

Figure 13:
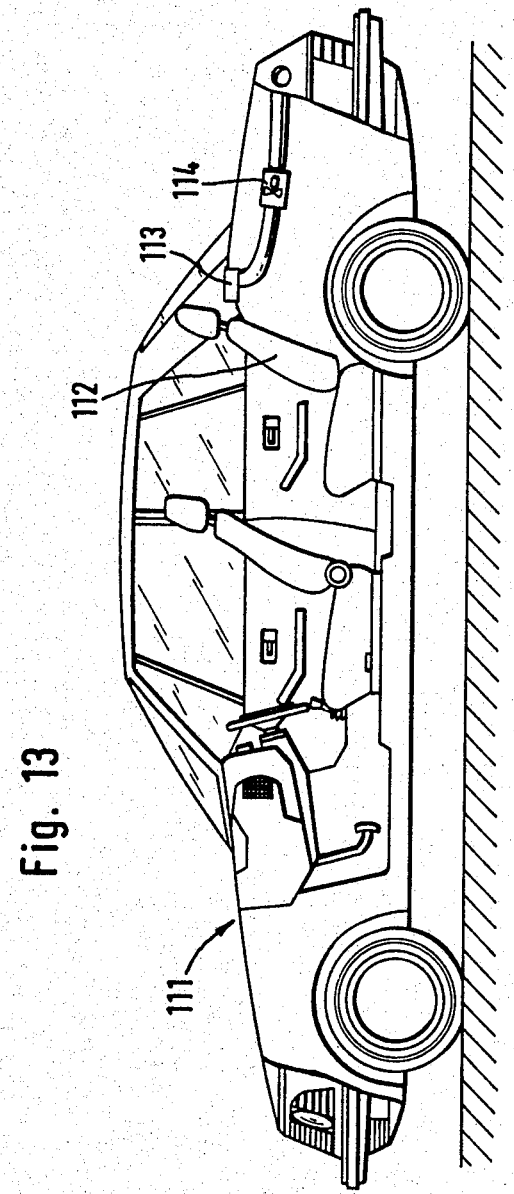
FIG. 13 is side view of a motor vehicle with built-in apparatus according to the invention.

A particularly space saving disposition of the filter provision is shown in FIG. 13 and in fact the same is provided in the area behind the rear head rests, at the so-called storage area.

In this manner the already tightly spaced areas for luggage and the engine are not any further restricted.

The passenger automobile is designated as 111 and its rear seat row is designated as 112. The automobile filter 113 is positioned in the covering behind the head rests of the row of rear seats 112 and in fact at the storage area. The suction means 114, preferably together with the built in blower, is fed to the rear in the region of the trunk area.

We claim:

1. An apparatus for purifying air to be fed to a cabin adapted to be occupied by at least one person, said apparatus comprising:

a housing communicating with said cabin;

means for inducing a flow of air through said housing and from said housing into said cabin;

a multilayer chemisorption filter in said housing traversed by said flow and operable at a temperature in excess of ambient temperature to absorb components of said flow;

a partial heater upstream of said chemisorption filter in said housing for heating the flow before it enters said chemisorption filter to a temperature preventing moisture take-up by said chemisorption filter from said flow;

a catalytic filter disposed downstream of said chemisorption filter in said housing for traversal by said flow for catalytically reacting components of said flow traversing said chemisorption filter;

a main heater between said chemisorption filter and said catalytic filter in said housing and traversed by said flow for heating said flow to a temperature in which the water vapor pressure of the flow entering said multilayer filter exceeds the moisture pickup temperature of said catalytic filter; and a cooler in said housing downstream of said catalytic filter for cooling the flow before it enters said cabin at a temperature suitable for said person in said cabin.

2. The apparatus defined in claim 1 wherein said cabin is the passenger compartment of a passenger motor vehicle and said housing is disposed in a trunk of the vehicle, said housing having an intake pipe disposed at a side of the vehicle remote from an exhaust pipe of the vehicle in the region of a bumper thereof.

3. The apparatus defined in claim 1 wherein said partial heater and said main heater form part of a combined heating-cooling unit and are separated from one another by a flow guide wall.

4. The apparatus defined in claim 3 wherein said unit consists of Peltier heating and cooling elements.

* * * * *